United States Patent [19]

Stamp, Jr. et al.

[11] 4,381,549

[45] Apr. 26, 1983

[54] AUTOMATIC FAULT DIAGNOSTIC APPARATUS FOR A HEAT PUMP AIR CONDITIONING SYSTEM

[75] Inventors: Custis L. Stamp, Jr., Tyler, Tex.; Rollie R. Herzog, Louisville, Ky.

[73] Assignee: Trane CAC, Inc., La Crosse, Wis.

[21] Appl. No.: 196,412

[22] Filed: Oct. 14, 1980

[51] Int. Cl.³ .......................................... G01M 19/00
[52] U.S. Cl. ................................ 364/557; 165/11 R; 364/551
[58] Field of Search ............... 165/14, 11 R; 364/557, 364/551, 571, 418; 62/127; 236/94

[56] References Cited

U.S. PATENT DOCUMENTS

| | | | |
|---|---|---|---|
| 3,890,836 | 6/1975 | McKenzie et al. | 165/11 X |
| 3,998,088 | 12/1976 | Kazangey | 364/551 X |
| 4,146,085 | 3/1979 | Wills | 165/11 |
| 4,234,926 | 11/1980 | Wallace et al. | 364/551 |
| 4,262,736 | 4/1981 | Gilkeson et al. | 165/11 R |
| 4,296,409 | 10/1981 | Whitaker et al. | 364/551 X |
| 4,296,727 | 10/1981 | Bryan | 165/11 R X |

Primary Examiner—Edward J. Wise

[57] ABSTRACT

Microprocessor controlled apparatus is provided for automatically diagnosing faults in a heat pump system. Temperature sensors located at strategic points in the system are read periodically in accordance with a preprogrammed diagnostic routine. Temperature measurements preferably representing comparison of two temperature readings that produce temperature differentials outside pre-established tolerance limits are stored with a fault identification representative of the corresponding fault measurement. A service technician can read the fault data from storage by activation of control means for that purpose whereby the nature of the causative fault or faults can readily be determined.

20 Claims, 7 Drawing Figures 4,381,549

AUTOMATIC FAULT DIAGNOSTIC APPARATUS FOR A HEAT PUMP AIR CONDITIONING SYSTEM

CROSS REFERENCE TO RELATED APPLICATIONS

This application is related to U.S. Pat. Nos. 4,328,680; 4,333,316; and 4,338,791, each issued to Custis L. Stamp, Jr., and Rollie R. Herzog; and concurrently filed patent application Ser. No. 196,414, filed in the names of Custis L. Stamp, Jr.; Rollie R. Herzog; and Michael A. Brennan, all assigned to General Electric Company, the assignee of the present invention.

BACKGROUND OF THE INVENTION

This invention relates to an automatic fault diagnostic apparatus for a heat pump type of air conditioning system. More specifically, it relates to microprocessor controlled apparatus for a heat pump system which has the ability to determine when the heat pump is operating improperly and has provisions for indicating to the owner of the system when service is required and also for indicating to the serviceman the general nature of the fault or faults involved in the improper operation.

SUMMARY OF THE INVENTION

In accordance with the invention, automatic fault diagnostic apparatus is provided for use with a heat pump air conditioning system of the type having refrigerant system functional components including an indoor heat exchanger, an outdoor heat exchanger, a refrigerant compressor and a switch-over valve all interconnected by refrigerant lines, the diagnostic apparatus being adapted to provide data representative of system faults to a service technician. The apparatus includes means for sensing temperatures at predetermined points on the system's functional operating components and means responsive to the temperature sensing means for performing one or more temperature measurement tests comparing the second temperatures to predetermined tolerance limits to determine if any of the temperatures is outside predetermined tolerance limits. The diagnostic apparatus of the invention includes means responsive to the test means for generating a fault signal for each test in which an out-of-tolerance temperature is found and means for storing the fault signal with a distinctive identification representative of the particular test in which the out-of-tolerance temperature was found. The apparatus still further includes means operable by a service technician to read out from the storage means data representative of each stored fault signal whereby the nature of the respective causative fault can then be determined by the service technician.

DESCRIPTION OF THE PREFERRED EMBODIMENT

Figure 1:
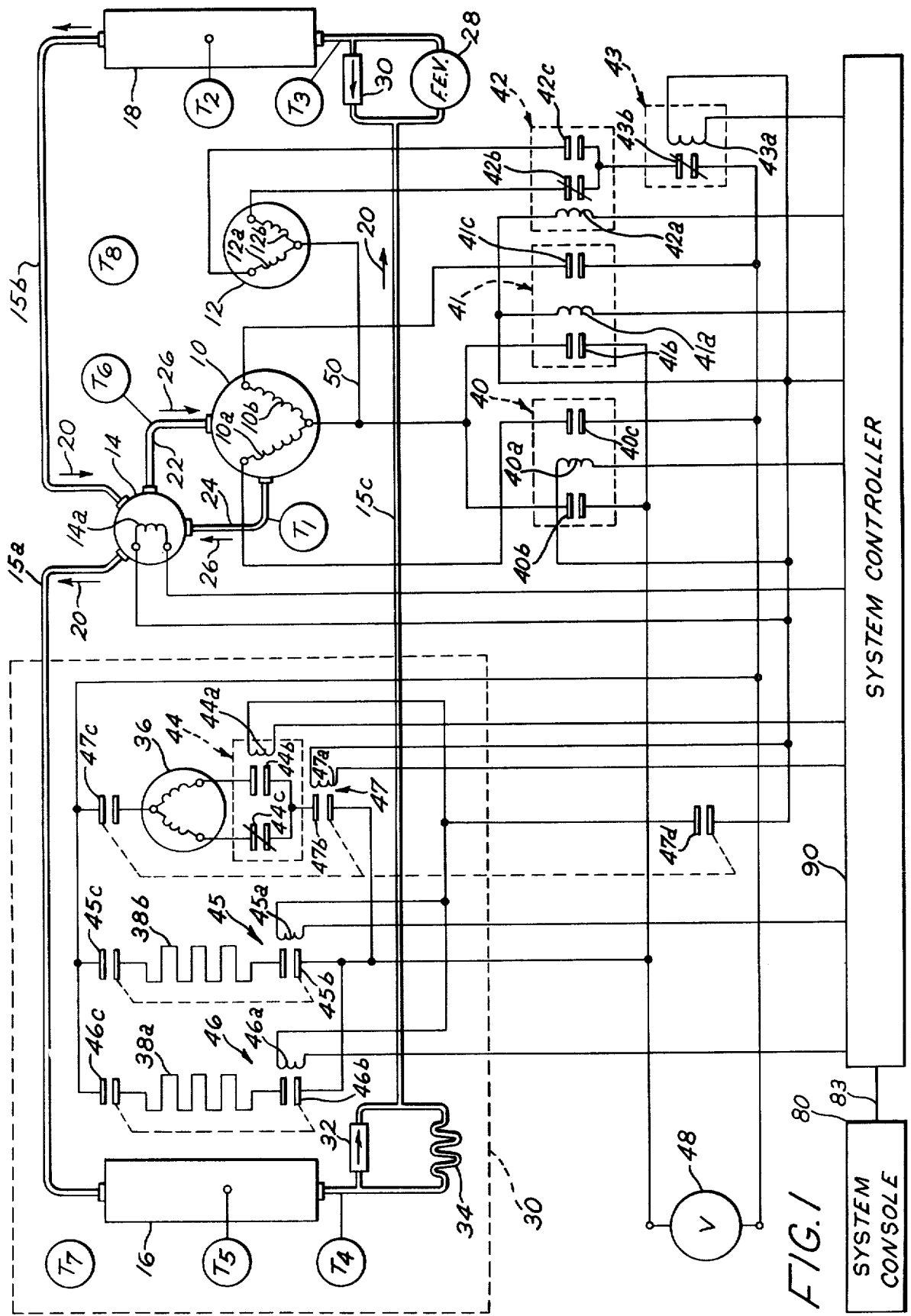
FIG. 1 is a diagram partly schematic of a heat pump system constructed in accordance with the present invention.

Referring now to FIG. 1, there is shown, in a preferred embodiment of the invention, a heat pump system which includes among its conventional components a two-speed compressor 10 and a two-speed fan 12. A conventional fluid switch-over valve 14 provides means for reversing the direction of flow of a fluid refrigerant through a series of pipe lines 15a, b and c and through indoor and outdoor heat exchanger coils 16 and 18, respectively, in order to switch the operation of the heat pump system between the basic functional operating modes of heating and cooling. A series of arrows 20 indicate the direction of refrigerant flow between the valve 14 and coils 16, 18 when the heat pump is operating in the heating mode. The refrigerant flows through the lines 15a, b and c in the direction opposite that indicated by the arrows 20 when the heat pump is operating in the cooling mode. In either operating mode, the fluid refrigerant is drawn from the valve 14 into a low pressure inlet port of the compressor 10 through a suction line 22 and is delivered from a high pressure outlet port of the compressor 10 back to the valve 14 through a high pressure line 24, all as indicated by a pair of arrows 26.

When the heat pump is operating in the heating mode, a conventional fluid expansion valve 28 permits the refrigerant to expand rapidly therethrough to cool to its lowest temperature within the closed fluid circuit just prior to entry into the cold end of the outdoor coil 18. A conventional one-way check valve 30 remains closed to the flow of refrigerant therethrough when the heat pump is operating in the heating mode, but freely allows passage of the refrigerant therethrough to bypass the expansion valve 28 when refrigerant is flowing in the direction opposite the arrows 20, as when the heat pump is operating in the cooling mode. A second one-way check valve 32 permits the refrigerant to flow freely from the coil 16 into the line 15c when the heat pump is operating in the heating mode but remains closed to the flow of refrigerant therethrough when the heat pump is operating in the cooling mode, thus forcing the refrigerant through a conventional fluid restrictor or capillary tube 34.

A dashed enclosure 30 represents a closed structure, such as a room or a residence, the internal air space of which is to be conditioned by the heat pump system. Those components of the fluid conductive circuit located within the structure include the indoor coil 16, the valve 32 and the capillary tube 34. In addition thereto, the "inside" components of the heat pump system include a two-speed fan 36 and may also include auxiliary electrical heaters 38a and 38b. Fan 12 and the remaining components of the fluid conductive circuit, namely, the compressor 10, valves 14, 28 and 30, and the outdoor coil 18 are located in the outdoor ambient atmosphere outside of the structure to be air conditioned.

Automatic control apparatus is also shown in FIG. 1, including system console 80 and system controller 90. These units, to be described in greater detail hereinafter, comprise a programmed electronic control system adapted to cause the heat pump system to operate in its normal functional operating modes in accordance with inputs provided to the system controller 90 from various condition sensors, such as indoor and outdoor temperature sensors $T_7$ and $T_8$ as well as inputs inserted by the user via system console 80. Additionally, they are responsive to temperature sensor inputs to perform the fault diagnosis, storage, and readout of the present invention.

Considering first the operation in the conventional heating and cooling functional operating modes, controller 90, on command, supplies suitable low voltage a.c. operating potentials to compressor and outdoor fan control relays 40–43 and to indoor fan and auxiliary heater relays 44–47. These relays, in turn, supply a suitable high voltage operating potential from a source 48 to the compressor 10, fans 12 and 36, and auxiliary heaters 38a, 38b. Source 48 may, for example, be the usual 240 volts, single phase potential. Additionally, controller 90 supplies a low voltage a.c. potential across solenoid coil 14a of the switch-over valve 14 to control the switchable state thereof, thus placing the heat pump system in either the basic heating or cooling operating mode. Controller 90 is also used to operate switch-over valve 14 during the heating mode to perform conventional defrost operations for short periods of time by reversing the refrigerant circuit so as to raise the temperature of the coils in the outdoor heat exchange unit 18 by an amount sufficient to melt any frost build up on the coils. The principles of the defrost cycle performed on command from controller 90 are described in the aforementioned U.S. Pat. No. 4,328,680, the entire disclosure of which is incorporated herein by reference.

Controller 90 operates heat pump compressor 10 at high speed by energizing relay coil 40a to close two sets of normally open relay contacts 40b and 40c, thus placing source 48 across high speed coil 10a of compressor 10. Similarly, controller 90 operates compressor 10 at low speed by de-energizing relay coil 40a and energizing relay coil 41a of low speed compressor relay 41 to close two sets of normally open contacts 41b and 41c, thus placing source 48 across low speed coil 10b of compressor 10.

Outdoor fan 12 may also be operated at high or low speed by controller 90, depending upon which of the high or low fan speed coils 12a or 12b is energized from the source 48 by the fan speed control relay 42. A line 50 connects one end of each of the coils 12a and 12b to one side of the source 48 whenever either of the high or low speed compressor relays 40 or 41 is energized to operate the compressor 10. The other end of the low speed fan coil 12b is connected through a set of normally closed contacts 42b of the relay 42 and a set of normally closed contacts 43b of the fan lockout or defrost relay 43 to the other side of source 48 so as to operate fan 12 at low speed when both of relays 42 and 43 are de-energized. Controller 90 switches outdoor fan 12 to high speed operation by energizing relay coil 42a of the fan speed control relay 42, thus opening the contacts 42b and closing a set of contacts 42c to switch source 48 from the coil 12b to the coil 12a. During defrost operations, outdoor fan 12 is rendered inoperative by the controller 90 even though compressor 10 is running by energizing coil 43a of the fan lockout or defrost relay 43, thereby opening contacts 43b and disconnecting fans 12 from source 48.

System console 80 is the primary manual input and display device that interfaces with the user and includes various desired input switches, display registers and associated logic circuits for manual entry of user-selected control data into the control apparatus of the invention. Console 80 is preferably located at a position within the conditioned space that enables the user to have convenient access thereto. On the other hand, it will generally be preferred to have system controller 90 located remotely from the console, such as in the basement or garage of a residence. Console 80 is, therefore, preferably coupled to controller 90 by means of conventional cabling schematically represented by line 83. Temperature sensor $T_7$ may also be included within the structure of console 80, although this is not essential.

The heat pump system, as thus described, may be set to have five major modes of operation which are mutually exclusive. These modes are: (a) OFF, (b) HEAT, (c) COOL, (d) FAN ONLY, and (e) STANDBY. The STANDBY mode and the means for entering and implementing such STANDBY mode are described in the aforementioned U.S. Pat. No. 4,333,316, the entire disclosure of which is incorporated herein by reference.

Considering first the normal functional operating modes: in OFF, no loads are actuated by controller 90. While in the HEAT mode, controller 90 will energize the appropriate heat pump loads as described in connection with FIG. 1 to bring the room or conditioned space temperature up to a user-selected target temperature. Controller 90 may also defrost the outdoor heat exchanger 18 in accordance with the defrost operation described in the aforementioned U.S. Pat. No. 4,328,680. Similarly, while in the COOL mode, the system will operate to hold the room temperature approximately at the user-selected target temperature. In the FAN ONLY mode, the system causes the indoor fan 36 to operate at, for example, a low speed with no other loads operated. Therefore, in this mode, the refrigerant system is not operative and no attempt is made to control room temperature.

Figure 2:
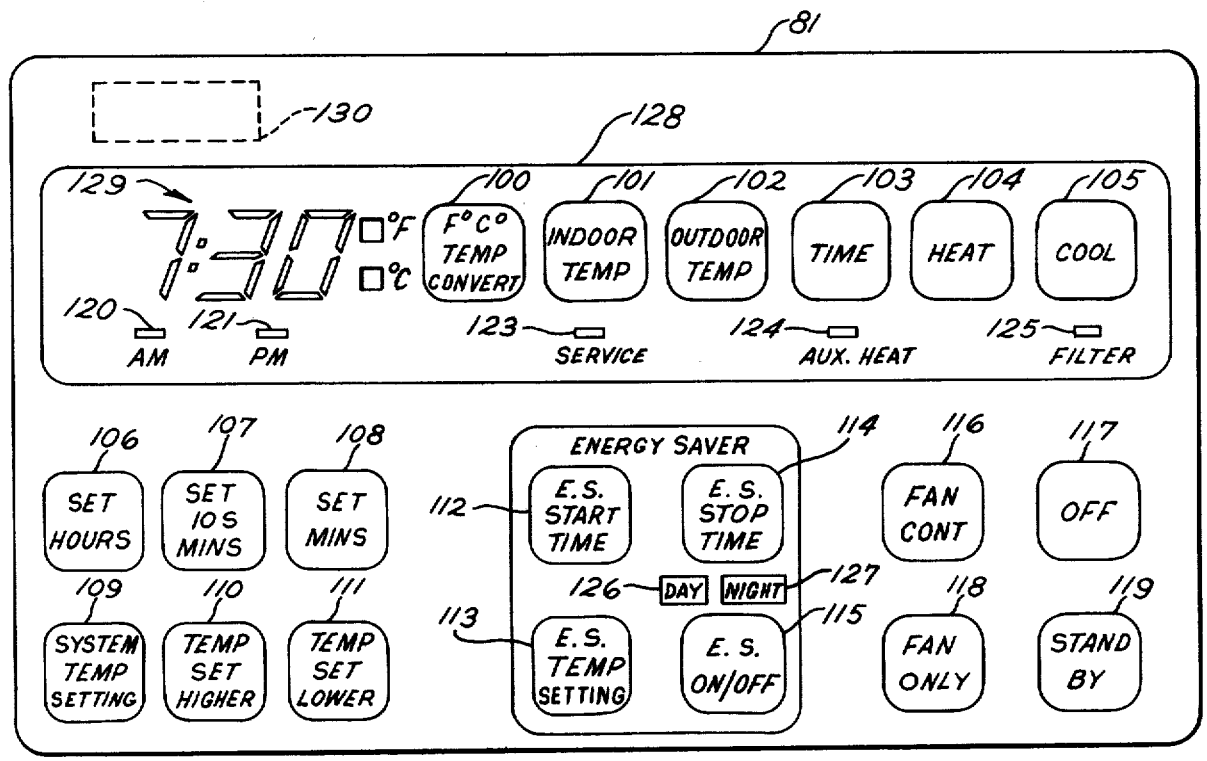
FIG. 2 illustrates a control panel layout for switched and readout devices embodied in the user-operated system console 80 of FIG. 1.
Figure 3:
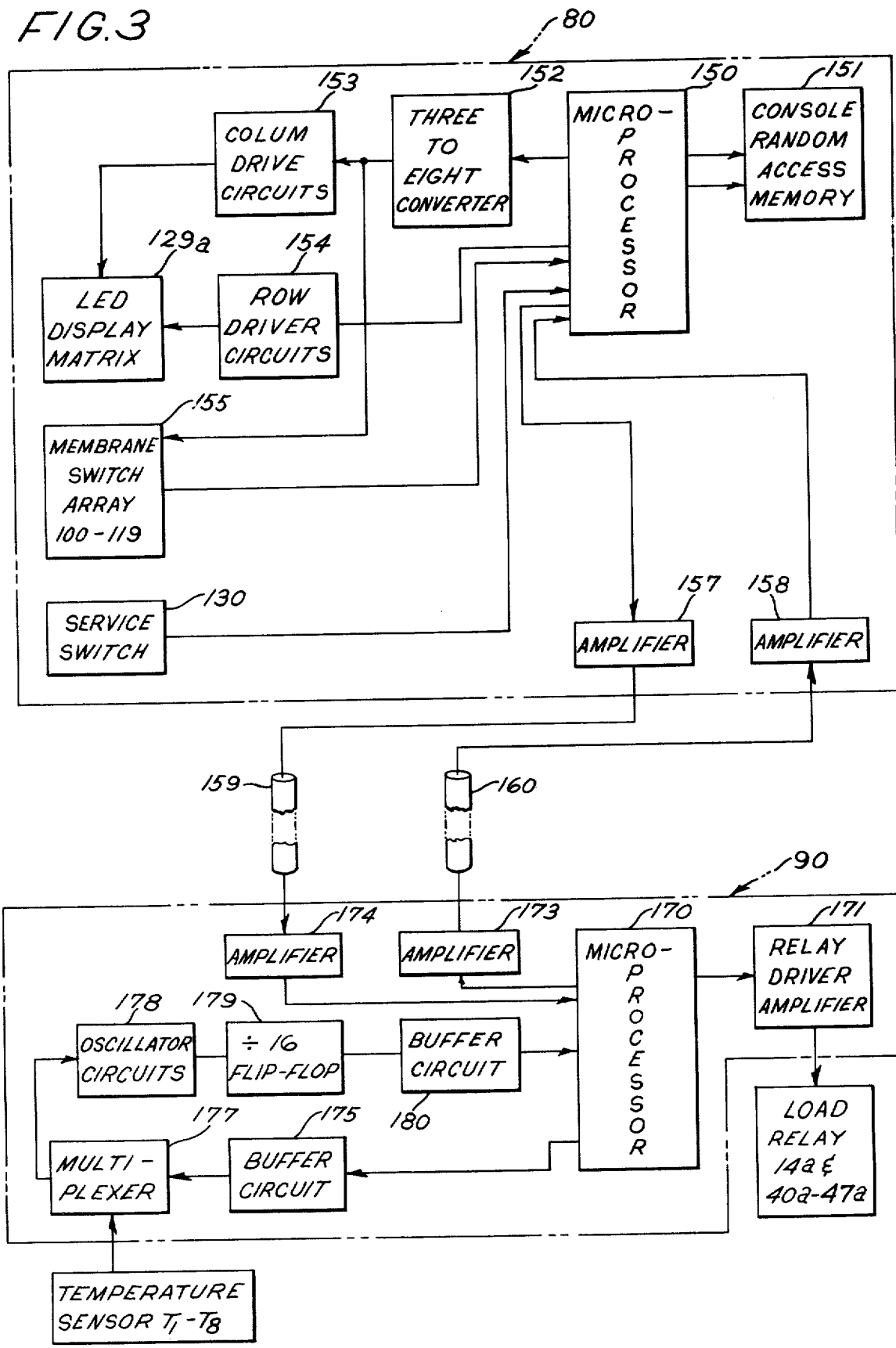
FIG. 3 is a block diagram of an embodiment of the system control console 80 and system controller 90 of FIG. 1.

In the STANDBY mode, controller 90 energizes appropriate loads corresponding to either a HEAT or COOL functional operating mode, depending on the actual room temperature conditions. Controller 90 acts to establish either of two new target temperatures, depending on which of the HEAT or COOL Modes the system is in, these new target temperatures superseding the existing target temperature manually set in console 80 by the user. These new target temperatures correspond to the upper and lower limits of an expanded temperature range within which the room temperature is to be maintained during the STANDBY operation, as for example while homeowners are away on vacation. These target temperatures are preprogrammed into controller 90 and may, for example, be 55° F., in the HEAT mode and 85° F. in the COOL mode. The instructions for this operation are maintained within a microprocessor in controller 90 as more fully set out in the aforementioned U.S. Pat. 4,333,316. The control panel of console 80 is shown in FIG. 2 and comprises a number of data input membrane switches 100–119, a light emitting diode display 129 for visual readout of time and temperature information and various status indicator lights 120–127. An additional membrane switch 130, to be used only during servicing of the heat pump system, may be positioned anonymously behind the face of the control panel. For convenience in locating this hidden switch, the area directly over the switch may have printed thereon the trade name or trademark of the heat pump manufacturer. As shown in FIG. 3, console 80 includes a microprocessor 150, which may be a Mostek MK 3870, and which is preprogrammed to perform, among other things, the program routines to be discussed subsequently. Microprocessor 150 has provision for temporary storge of volatile data necessary for continuous use during program operations within the console 80. Additionally, the volatile data may be stored in a separate CMOS random access memory 151 which is alternatively powered by a separate battery, not shown, to retain the volatile data in the event of a loss of the normal functional operating power. Binary timing signals from microprocessor 150 are converted in 3 to 8 converter 152 to a series of strobe signals which are coupled through column driver circuits 153 to the column connections of LED display matrix 129a and also to the membrane switch array 155. At appropriate points in the timing cycle, LED row drive signals are provided from the output of microprocessor 150 to row driver circuits 154 where they are current amplified and applied to the row connections of LED matrix 129a. The particular display generated by matrix 129a is then a function of the coincidence of current drive generated by appropriate instructions from microprocessor 150. The strobe signals from 3 to 8 converter 152 are also applied to the membrane switch array 155. Depending on which switch in array 155 is closed, suitable signals are then applied back to microprocessor 150, thus providing user-inserted volatile data to the microprocessor. In normal operation, the user-perceived functional data, as indicated on the face of the control panel of console 80, is coupled from the switches into microprocessor 150. However, in accordance with one feature of the present invention, activation of service switch 130 for a minimum period of time, such as ten seconds, conditions microprocessor 150 to cause the membrane switch array 155 to activate the microprocessor in accordance with preprogrammed service mode instructions. The minimum time period which switch 130 must be held depressed is to assure that entry into the service mode is a deliberate act and not the result of accidental or playful depression of switch 130.

As previously noted, console 80 is normally located in the structure where the air space is to be conditioned, while controller 90 is normally located in a convenient storage location remote from console 80. It is, therefore, necessary to provide for data communication between console 80 and controller 90. In the case of communication from console 80 to controller 90, this is accomplished by an output circuit, including amplifier 157, which is coupled through cable 159 to input amplifier 174 of controller 90, the output of which is then fed into microprocessor 170 which may also be a Mostek MK 3870. Conversely, data signals from microprocessor 170 of controller 90 are processed through amplifier 173, cable 160 and amplifier 158 to the input of microprocessor 150.

Considering now controller 90 as it pertains to the present invention, microprocessor 170 periodically reads the condition of temperature sensors $T_1$–$T_8$ by means of timing control signals which are coupled through buffer amplifier circuit 175 to multiplexer 177 where they are suitably combined so as to connect each of the thermistors sequentially to the input of oscillator circuit 178. The resistance of each thermistor in conjunction with the resistance of its coupling network (not shown) combines to control in known manner the oscillation frequency of oscillator 178 thus providing at the output of oscillator 178 a signal, the frequency of which is representative of the temperature being sensed by the thermistor in question. This signal is then applied to a "divide-by-sixteen" flip-flop circuit 179 to reduce the temperature signal frequency to a range which is suitable for use in microprocessor 170.

This reduced frequency signal is then applied through buffer amplifier 180 to an input of microprocessor 170 where the period of the signal frequency is monitored to convert to a temperature value. To accomplish this, microprocessor 170 executes a preprogrammed subroutine to count the number of pre-established time increments between the leading and lagging edges of each half cycle of the square wave appearing at the output of flip-flop 179. This number is then compared by another subroutine in microprocessor 170 to a "temperature" table in its read only memory (ROM) to determine the temperature being sensed by the thermistor in question. By suitably programming this numbered table into the ROM of microprocessor 170, a high degree of linearization of the thermistor reading is obtained. Microprocessor 170 also serves, in accordance with instructions communicated from console 80, to operate the load relays 40a–47a and solenoid coil 14a by means of control signals coupled through relay driver amplifiers 171.

In FIG. 1 a single room temperature sensor $T_7$ is shown for illustrative purposes. However, as will be considered in connection with the programmed operation of the system, it is a feature of this invention that two or more room temperature sensors may be employed with the average reading used to control the operation of the system. Most importantly, if one sensor fails, the other sensor or sensors may then be relied on to control the system. As long as any one indoor temperature sensor operates properly, the system will continue to operate properly, a fault condition arising only when all temperature sensors fail.

Before describing the specific manner in which microprocessors 150 and 170 may be programmed to perform the diagnostic functions of the present invention, it will be helpful to discuss generally the manner in which the system operates as it progresses through the diagnostic routine. As previously mentioned, the display panel of console 80 serves to display diagnostic information. At any time during the system's operation, if controller 90 detects a system fault, service indicator light 123 will be lit. Also, service light 123 will be lit if console 80 detects a fault in its circuitry or a continued failure to communicate properly with controller 90. The purpose of the service light is to indicate to the user that a system fault has occurred and that a service technician should be called.

The technician begins a service diagnostic test of the system by actuating the hidden membrane switch 130 for a predetermined minimum length of time, such as ten seconds, as previously described, thus initiating the service mode in the console. While in the service mode, console 80 reads all temperature sensors upon specific commands and also reads out via display 129 any system faults that exist and which have been stored with their respective identification in the memory of microprocessor 150. A second push of the service switch 130 cancels the service mode and returns the console 80 to normal operation. The service mode also contains a one minute time out which causes the service mode to terminate automatically with return to normal operation at the end of a one minute time period during which no buttons on console 80 have been pushed. During the service mode, controller 90 preferably causes the heat pump system to operate in accordance with the normal user-inserted functional instruction which existed at the time of entry into the service mode. For example, if in either the heat or cool mode, controller 90 controls the system to the set point temperature in the normal manner.

During the service mode, one or more of the switches on the face panel of console 80 performs an alternate function such as that listed in Table I so that the service technician may call out from the system certain key performance data that is useful in analyzing the operation of the system.

TABLE I

| Switch No. | Normal Switch Function | Service Mode Displayed Quantity |
|---|---|---|
| 112 | E.S. Start Time | $T_1$-Discharge temp. |
| 114 | E.S. Stop Time | $T_2$-Outdoor coil midpoint temp. |
| 116 | Fan Continuous | $T_3$-Outdoor coil bottom temp. |
| 117 | OFF | $T_4$-Indoor coil bottom temp. |
| 113 | E.S. Temp. Setting | $T_5$-Indoor coil midpoint temp. |
| 115 | E.S. ON/OFF | $T_6$-Suction temp. |
| 100 | Temp. Convert | Unchanged |
| 101 | Indoor Temp. | Unchanged-($T_7$) |
| 102 | Outdoor Temp. | Unchanged-($T_8$) |
| 103 | Time | All LED's display |
| 104 | Heat | Fault numbers display |
| 105 | Cool | Service defrost |

Operation of the Heat switch 104 during the service mode causes each of the fault numbers, if any, previously stored in the memory of microprocessor 150 to be displayed in sequence. The programmed storage of the faults is such that the first fault to occur in the system, in the case of multiple faults, is stored in a "first to occur" register in the memory and is read out first with its identifying number as indicated in Table II. Thereafter, each fault is stored in the memory according to its identifying number and is read out in sequence according to its identifying number. For convenience of the service technician, the faults are preferably caused to be read out such that the next following fault is displayed with each subsequent push of Heat switch 104. At the same time, the technician can activate any desired one of the switches 100–102 or 112–117 to get a current temperature reading at the selected sensor location to assist in determining whether the fault indicated by pushing Heat switch 104 still exists.

As explained in aforementioned U.S. Pat. No. 4,328,680, controller 90 is normally programmed to direct the initiating of system defrost at certain intervals determined by preselected timing intervals as adjusted by operating conditions encountered by the system. For system diagnostic purposes, as contemplated by the present invention, when the system is in the Heat mode and is running in that mode at the time of entry into the service routine, console 80 is programmed to accept a push at this time on the Cool switch 105 to override the timing of the automatic defrost operation to immediately enter system defrost, assuming an initial lockout period has been passed.

As previously noted, controller 90 is programmed in accordance with the invention to monitor the heat pump system continously during its operation and to light the console service indicator light 123 if a fault should occur. The fault is assigned a distinctive identification number and is caused to be stored in the memory of microprocessor 150 with that distinctive identification. While any variety of faults and identification systems might be employed, Table II represents what is at present described to be the preferred choice of faults to be displayed with representative indicator numbers.

TABLE II

| Identification Number | Fault Identified |
|---|---|
| General Operation: | |
| Display Blank | -No faults and no service light |
| Cooling Operation: | |
| 01 | -Compressor failure: $T_1-T_7 \leq 11°$ C. after 15 min. of service lockout (L.O.) |
| 02 | -Low refrigerant charge: $T_5-T_4 > 5.5°$ C. after 15 min. of service L.O. - (Not checked if $T_8 < 15.5°$ C.) |
| 03 | -Stuck switchover valve 14: $T_4-T_7 > 5.5°$ C. after 15 min. of service L.O. |
| Heating Operation: | |
| 10 | -Defrost fault: Defrost terminated by time over-ride more than 20 consecutive times. |
| 11 | -Compressor failure: $T_1-T_8 \leq 11°$ C. after 15 min. service L.O. |
| 12 | -Low charge: $T_2-T_3 > 5.5°$ C. after 15 min. service L.O. |
| 13 | -Stuck switchover valve: $T_7-T_4 > 5.5°$ C. after 15 min. service L.O. |
| Temperature Sensor Failures: | |
| 20 | -$T_2$ reads saturated high temp. after 15 min. service L.O. in Heat only. |
| 21 | -$T_3$ reads saturated high temp. after 15 min. service L.O. in Heat only. Use $T_2$ for defrost information when $T_3$ fails. |
| 22 | -$T_2$ reads saturated low temp. after 3 min. service L.O. in Defrost only. |
| 23 | -$T_3$ reads saturated low temp. after a 3 min. service L.O. in Defrost only. Use $T_2$ for defrost information when $T_3$ fails. |
| 24 | -All room temperature sensors read saturated high or saturated low. System reverts to OFF program from Heat or Cool or Standby. |
| System Controller 90 Fault | |
| 30 | -System controller 90 loses communication from console 80 for more than one minute. System controller goes to Standby. |
| Console 80 Fault | |
| 36 | -System console 80 loses communication from controller 90 for more than one minute. |

Service test lockout as referred to in Table II is employed in the system to inhibit diagnostic tests as indicated in the table to insure that the heat pump refrigerant system has had an opportunity to stabilize before test measurements are taken.

Figure 4:
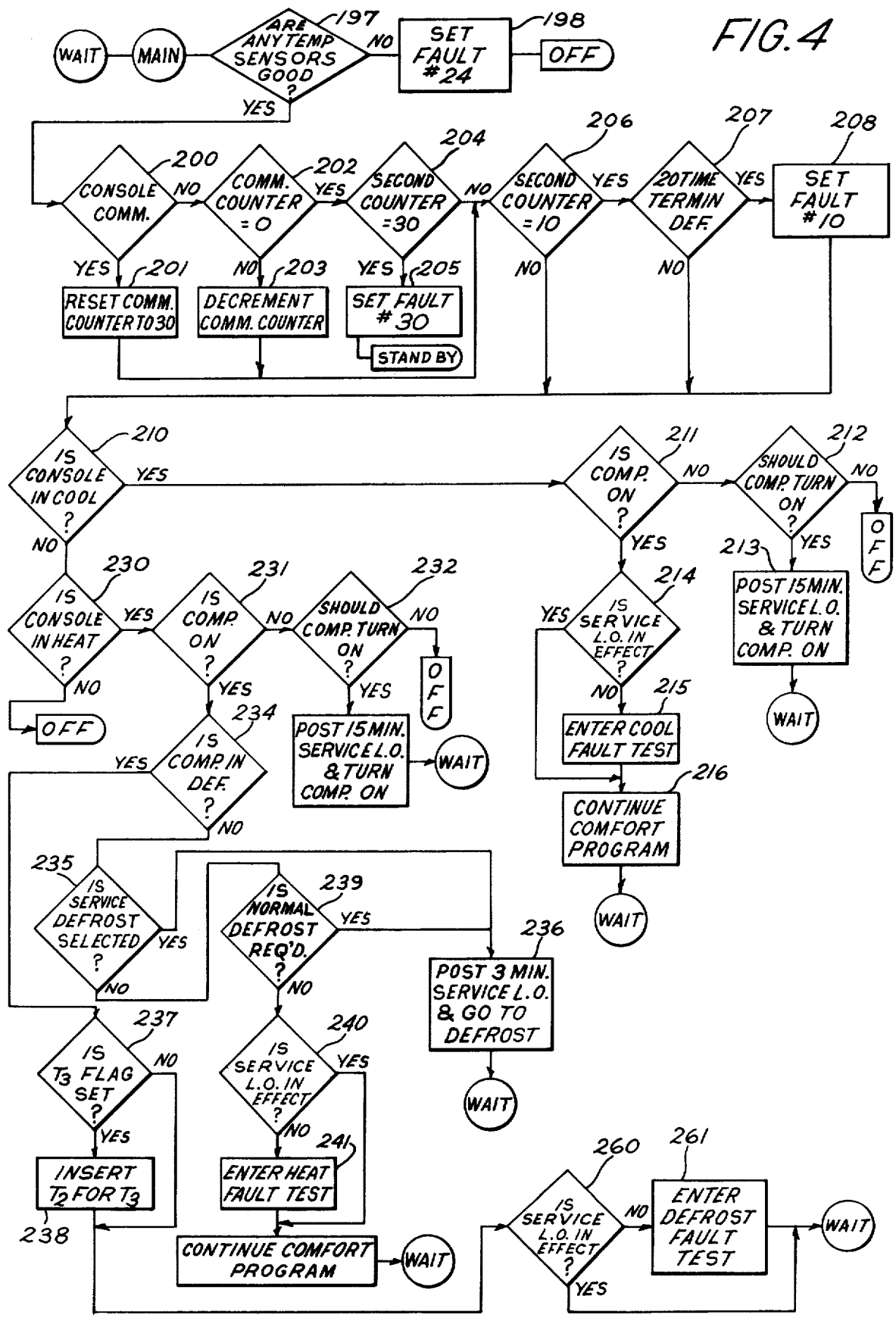
FIGS. 4–7 are microcomputer program flow diagrams for automatic diagnostic control apparatus useful in the operation of the FIG. 1 heat pump system in accordance with the present invention.

Referring now to FIGS. 4–7, microcomputer flow diagrams are shown for the diagnostic functions of the present invention, as just described, and based on which the microprocessors 150 and 170 may be suitably programmed using well known techniques. FIG. 4 illustrates the main diagnostic program flow diagram which is entered at a suitable point from the main system program. In these flow diagrams, diamond shaped boxes represent program inquiries that lead to program instructions shown in rectangular boxes, while circles and bullets represent instructions to go to other points or subroutines in the program.

Upon entering the diagnostic routine, and assuming that more than one indoor temperature sensor is employed in the system, an initial inquiry 197 determines if all indoor temperature sensors are bad, i.e. reading saturated temperature levels. If this is the case, instruction 198 sets fault No. 24 and puts the program into the OFF routine. If any indoor temperature sensor is good, an inquiry 200 is then made to determine if proper communications exist between console 80 and controller 90, the inquiry being performed, for example, by means of a comparison of redundant check code data signals sent between console 80 and controller 90. If the answer is Yes, a communications counter is reset by instruction 201 to a predetermined count, such as 30, and the program advances to the next inquiry 206. However, if the answer is No, an inquiry 202 is made as to whether the communication has reached a zero count. If not, the counter is decremented by instruction 203 and the program then advances to inquiry 206. If the counter has reached zero, this indicates that thirty successive invalid communications have occurred whereupon an internal seconds timer is interrogated by inquiry 204 to determine if it is at a count of 30. If yes, instruction 205 causes fault No. 30 to be stored in the memory of microprocessor 150 and the program then enters the standby mode operation as described in copending application 9B-CC-14081. If No, the program then advances to inquiry 206.

It will be recalled from Table II that various faults were assigned specific identification numbers. In the present embodiment of the invention, these numbers correspond to the seconds number of the internal seconds counter. In this way the fault diagnostic routine is recycled once per second with only one fault being entered into storage once-per-second time period, the storage register corresponds to the seconds count of the internal timer.

Inquiry 206 determines if the seconds counter is at 10 and, if yes, inquiry 207 determines if 20 consecutive time terminated defrosts have occurred, which would indicate improper defrost operation. If so, instruction 208 causes the fault number 10 to be stored in the appropriate storage register as previously described.

The program then proceeds to determine in inquiries 210 and 230 whether console 80 is set in either the Cool or Heat modes and, if not, the program moves into the Off program since the need for determining further operating faults of the type previously described is obviated.

If the console 80 is in the Cool mode, inquiry 211 determines whether the refrigerant compressor is on. If not, inquiry 212 determines from the available temperature information whether the compressor should turn on. Depending on the results of inquiry 212, the program either enters the Off program routine or instruction 213 causes the compressor to turn on and enters a fifteen minute service lockout for reasons previously discussed. If inquiry 211 determines the compressor is on, inquiry 214 then determines whether the system is in a diagnostic lockout which is established to assure that the refrigerant system has operated for a sufficient length of time, such as fifteen minutes, to have reached a stabilized condition before any fault tests are conducted. This is to minimize the generation of incorrect fault readings. If the diagnostic lockout is not in effect, the system enters the Cool fault test routine; otherwise, the system continues with the existing comfort program.

Figure 5:
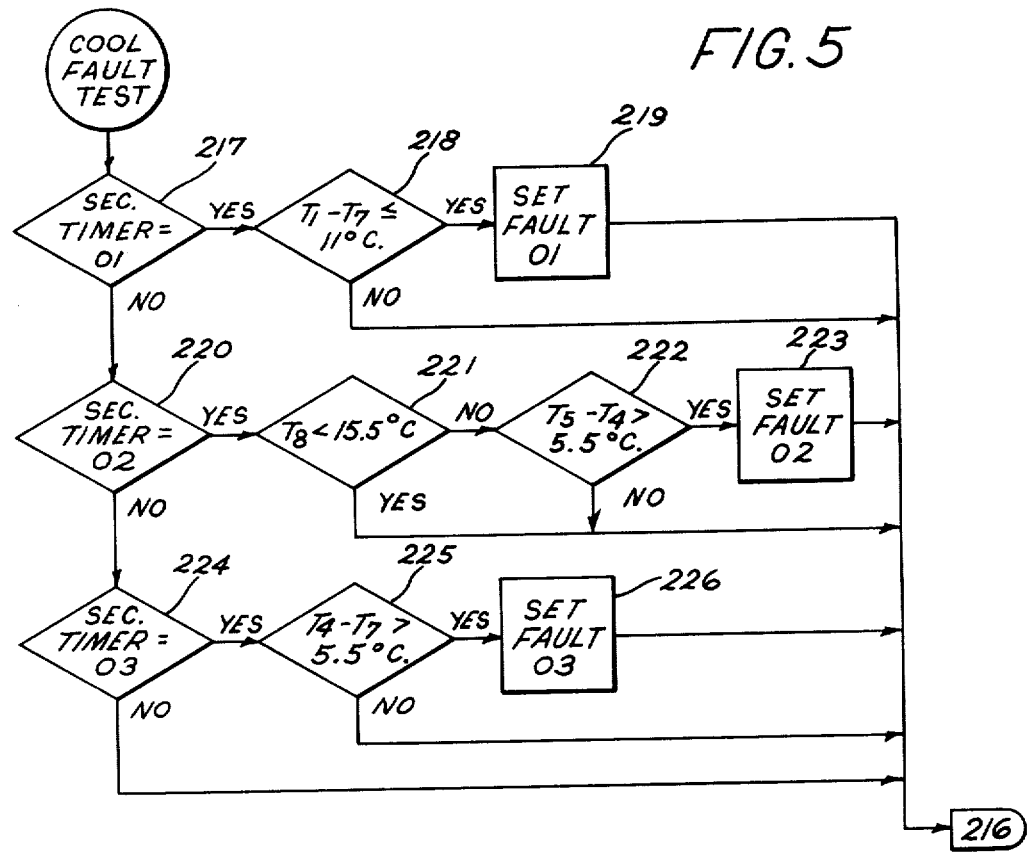

Referring to FIG. 5, the first Cool fault test is for compressor failure and is performed during second No. 01 of the internal timer. In this test, inquiry 218 determines if the compressor discharge temperature has not risen above the room temperature by some predetermined differential such as 11° C., which, if true, causes fault No. 01 to be stored in the corresponding register of memory in microprocessor 150. During second No. 02, as determined by inquiry 220, inquiry 221 determines if outdoor temperature is above a minimum temperature, such as 15.5° C., as a condition precedent to inquiry 222 which then determines whether an excessive temperature drop (e.g. >5.5° C.) exists from the indoor coil midpoint to the bottom which would thereby indicate inadequate refrigerant charge in the system. If Yes, instruction 223 stores the appropriate fault signal. During second No. 03 (as determined by inquiry 224), inquiry 225 determines from a comparison of the indoor coil bottom temperature $T_4$ with the room temperature $T_7$ whether a stuck switchover valve 14 exists. If the $T_4-T_7$ differential exceeds a predetermined amount, such as 5.5° C., instruction 226 causes the appropriate fault signal 03 to be stored.

Referring back to FIG. 4, and assuming that console 80 is in the heat mode as determined by inquiry 230 and also assuming that the compressor is determined by inquiry 231 to be on or else is turned on during a previous cycle by the process of inquiry 232 and instruction 233, program inquiry 234 then inquires if the compressor is in a defrost cycle. If not, and if inquiry 235 determines that a service defrost is required by virtue of pushing the Cool button during the service mode, as previously described, the instruction 236 posts a three minute service lock out and enters the defrost mode. If not in service defrost, the program then determines, via inquiry 239, whether normal defrost operation is required. If normal defrost is required, instruction 236 is entered as previously described. If not, inquiry 240 determines if a service lockout is in effect and, if not, instruction 241 causes the program to enter the heat fault test subroutine shown in FIG. 6; otherwise, it causes the program to revert to the normal comfort program. Since the general operation of the heat fault test of FIG. 5 is the same as the cool fault test of FIG. 5, with the exception of the specific temperature measurements taken, a detailed description is believed unnecessary. It is sufficient to note that each test is made during a predetermined second interval which establishes the identification of the particular test for storage and display purposes. The nature and purpose of each test may be determined with reference to Table II. Also, it will be appreciated that, in the Heat fault tests as well as the other tests herein described, the specific temperature values selected, while considered desirable, are not be treated as absolute limitations since the values may be varied as is known in the art without departure from the spirit of the invention.

Figure 7:
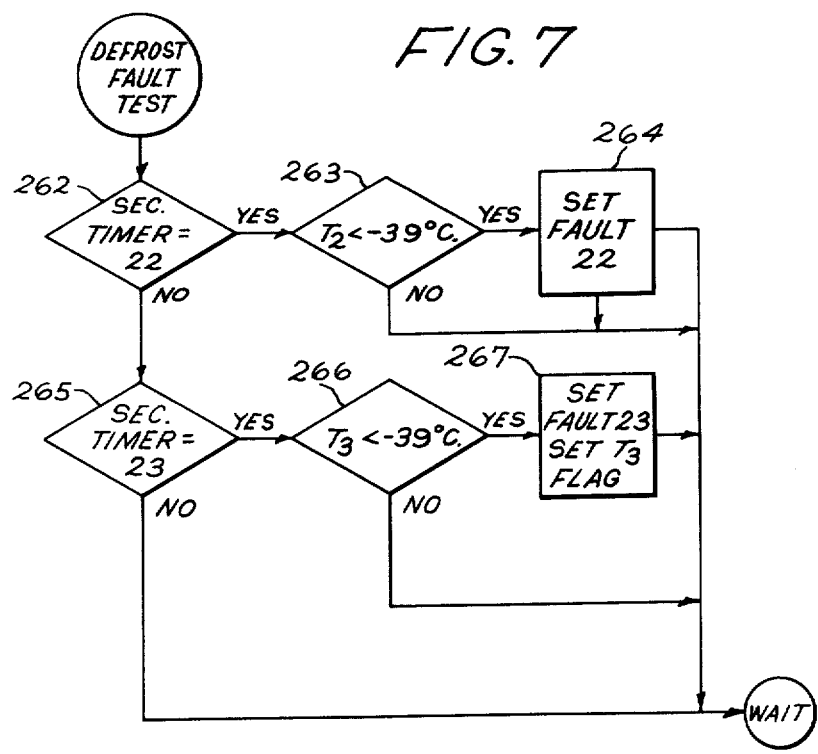
Figure 6:
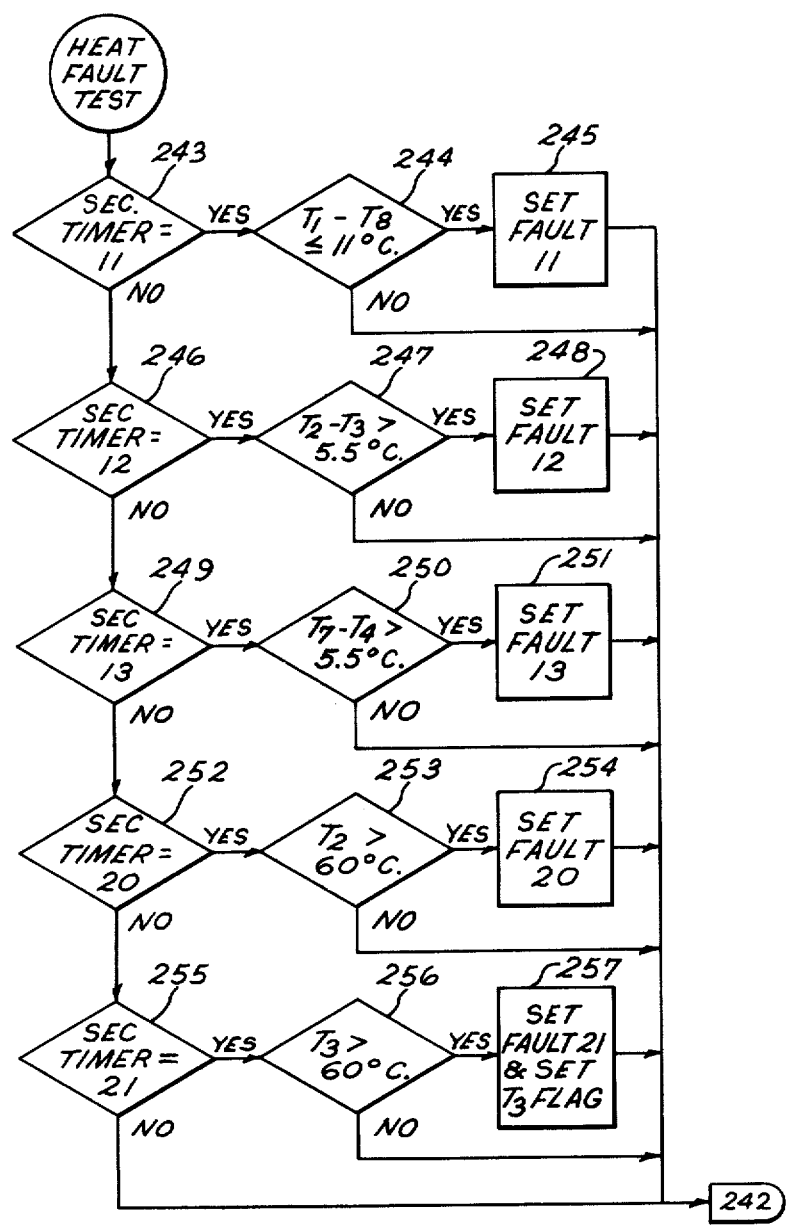

Referring again to FIG. 4, if inquiry 234 determines that the heat pump system is in the defrost mode and inquiry 260 confirms that the system is not in a service lockout condition, instruction 261 then enters into defrost fault test shown in FIG. 7. Thus, during second No. 22, a saturated low reading of temperature sensor $T_2$, in inquiry 263, causes a corresponding fault signal to be stored by instruction 264 while during second No. 23 a similar defect in temperature sensor $T_3$, determined by inquiry 266, causes a corresponding fault signal to be stored by instruction 267. However, in this latter case, the program instruction 267 also causes a "$T_3$bad" flag to be set in the microprocessor storage which then results in $T_2$ temperature readings being usef for defrost readings in the operation of the main program defrost cycle, as previously described in FIG. 4. During defrost, $T_2$ and $T_3$ are tested for saturated low temperature and during heat, they are tested for saturated high temperature and the $T_3$ bad flag can be set in either instance.

While, in accordance with the patent statutes there has been described what at present is considered to be the preferred embodiment of the invention, it will be obvious to those skilled in the art that various changes and modifications may be made therein without departing from the invention. It is, therefore, intended by the appended claims to cover all such changes and modifications as fall within the true spirit and scope of the invention.

What is claimed is:

1. Automatic fault diagnostic apparatus for use with a heat pump air conditioning system of the type having refrigerant system functional operating components including an indoor heat exchanger, an outdoor heat exchanger, a refrigerant compressor and a switchover valve all interconnected by refrigerant lines, said diagnostic apparatus adapted to provide data representative of system faults to a service technician, said apparatus comprising:

means for sensing temperatures at a plurality of predetermined points on the system's functional operating components and for sensing indoor and outdoor air temperatures;

means jointly responsive to at least a pair of the temperature sensing means for performing one or more predetermined comparative temperature measurement tests comparing the sensed temperature to predetermined tolerance limits to derive a measurement based on the temperature differential between said at least a pair of sensors to determine if measured temperature differentials are outside predetermined tolerance limits;

means responsive to the test means for generating a fault signal for each test in which an out-of-tolerance temperature differential is found;

means for storing each fault signal with a distinctive identification representative of the particular test in which the out-of-tolerance temperature differential was found;

and means operable by a service technician to read out from the storage means data including said distinctive identification representative of each stored fault signal whereby the nature of the respective causative fault can then be determined by the service technician.

2. The automatic fault diagnostic apparatus of claim 1 wherein the storage means stores at least one of the fault signals in a manner which identifies the sequence of real time occurrence of the fault with respect to the other faults which may have occurred and wherein the data readout means provides an indication of the sequence of real time occurrence of said at least one fault signal.

3. The automatic fault diagnostic apparatus of claim 2 wherein only the first of said fault signals is stored and read out with an identification as to the sequence in which said fault occurred with respect to other faults which may have occurred.

4. Automatic fault diagnostic apparatus in accordance with claim 1 wherein said apparatus further includes clock means for providing a seconds count within the apparatus and wherein only one particular temperature measurement test is performed during any given seconds count and wherein said distinctive fault signal identification comprises the seconds count during which the temperature measurement was made which resulted in the fault signal.

5. Automatic fault diagnostic apparatus in accordance with claim 1 in which additional means are provided for inhibiting fault test measurements for a predetermined minimum period of operation in the selected mode of operation whereby system stabilization is achieved prior to performing fault test measurements.

6. Automatic fault diagnostic apparatus of claim 1 adapted to detect a compressor fault wherein one of said heat exchangers operates as an evaporator, wherein said temperature sensing means includes a first temperature sensor attached to the discharge line of the refrigerant compressor of said air conditioning system and a second temperature sensor for indicating the air temperature of ambient space in communication with said evaporator, wherein said temperature measurement means measures the difference between said discharge line temperature and said space temperature, and wherein said fault signal generation means produces a fault signal representative of a compressor fault when the differential between said measured temperatures is within a predetermined range representative of a compressor fault.

7. Automatic fault diagnostic apparatus of claim 6 adapted to detect a compressor fault during a cooling mode of operation in which said second temperature sensor indicates indoor air temperature and in which the fault signal generation means produces a compressor fault respresentative signal when said temperature differential is equal to or less than a predetermined value representative of said compressor fault.

8. Automatic fault diagnostic apparatus of claim 7 in which said predetermined value is approximately 11° C.

9. Automatic fault diagnostic apparatus of claim 6 adapted to detect a compressor fault during a heating mode of operation in which said second temperature sensor indicates outdoor air temperature and in which the fault signal generation means produces a compressor fault representative signal when said temperature differential exceeds a predetermined value representative of said compressor fault.

10. Automatic fault diagnostic apparatus of claim 9 in which said predetermined value is approximately 11° C.

11. Automatic fault diagnostic apparatus of claim 1 adapted to detect an insufficient refrigerant charge fault in which said temperature sensing means includes a first temperature sensor in thermal contact with approximately the midpoint of the heat exchanger operating as an evaporator and a second temperature sensor in thermal contact with a point approximately at the bottom of said evaporator heat exchanger, and in which the temperature measurement means measures the temperature difference bertween said two points to determine if the difference is greater than a predetermined temperature differential representative of an insufficient refrigerant charge in said system.

12. Automatic fault diagnostic apparatus of claim 11 in which said predetermined temperature differential is approximately 5.5° C.

13. Automatic fault diagnostic apparatus of claim 11 in which there is included a third temperature sensor for indicating outdoor air temperature and in which, during a cooling mode of system operation, means are included for inhibiting said refrigerant charge fault temperature measurement means when the outdoor air temperature is below a predetermined value.

14. Automatic fault diagnostic apparatus of claim 13 in which said outdoor air temperature value is approximately 15.5° C.

15. Automatic fault diagnostic apparatus of claim 1 adapted to detect when said switchover valve is stuck in the incorrect position for heating or cooling system operating modes wherein said temperature sensing means includes a first temperature sensor $T_7$ indicating temperature of the space being conditioned by the heat pump system and a second temperature sensor $T_4$ attached approximately at the bottom of the indoor heat exchanger, wherein the measurement means, during the cooling operating mode, determines the temperature difference $T_4-T_7$ and, during the heating operating mode determines the temperature difference $T_7-T_4$, and wherein said fault signal generating means generates a fault signal representative of said stuck valve condition when during the heating or cooling operating mode said corresponding temperature difference exceeds a predetermined value.

16. Automatic fault diagnostic apparatus of claim 15 in which said predetermined value is approximately 5.5° C.

17. Automatic fault diagnostic apparatus of claim 1 which said service technician operable means includes a plurality of system control switch means for selecting system operating modes and temperature/time readouts during normal system operation, and includes a separate control switch which, when activated for a preselected minimum extended time period, causes at least some of said system control switches to assume alternate functions required for system diagnostic purposes.

18. Automatic fault diagnostic apparatus of claim 1 in which said temperature sensing means includes a plurality of room temperature sensors and in which said means responsive to the test means is adapted to generate a fault signal when all of the room temperature sensors results in a temperature measurement outside predetermined tolerance limits.

19. Automatic fault diagnostic apparatus of claim 1 in which the means operable by the service technician is also adapted to read out current system temperature information, upon command by the service technician, whereby the technician is able to determine whether a fault reading is still valid at the time the fault data is read out.

20. Automatic fault diagnostic apparatus of claim 1 in which said temperature sensing means includes a first temperature sensor positioned in thermal contact with the bottom of the outdoor heat exchanger and a second temperature sensor positioned in contact with an intermediate point on the outdoor heat exchanger; in which said test measurement means determines whether said first temperature sensor is operating to properly indicate sensed temperature and, if not, to substitute a temperature measurement based on temperature sensed by said second temperature sensor, and in which said fault signal generating means generates a fault signal indicating improper operation of said first temperature sensor.

* * * * *